G. LANGFORD

Feb. 10, 1931. RAIL JOINT AND BAR Re. 17,963

Original Filed Nov. 8, 1929 4 Sheets-Sheet 1

Inventor
George Langford
By Brown, Jackson, Boettcher & Dienner,
Attys.

G. LANGFORD

Feb. 10, 1931. RAIL JOINT AND BAR Re. 17,963

Original Filed Nov. 8, 1929 4 Sheets-Sheet 2

Inventor:
George Langford.

By Brown, Jackson, Boettcher & Dienner,
Attys.

G. LANGFORD

RAIL JOINT AND BAR

Feb. 10, 1931.

Re. 17,963

Original Filed Nov. 8, 1929

4 Sheets-Sheet 3

Inventor:
George Langford

By Brown, Jackson, Boettcher & Dienner.
Attys.

G. LANGFORD

Feb. 10, 1931.

RAIL JOINT AND BAR

Re. 17,963

Original Filed Nov. 8, 1929

4 Sheets-Sheet 4

Inventor:
George Langford.

By Brown, Jackson, Boettcher & Dienner.
Attys.

Reissued Feb. 10, 1931

Re. 17,963

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

RAIL JOINT AND BAR

Original No. 1,757,774, dated May 6, 1930, Serial No. 405,604, filed November 8, 1929. Application for reissue filed November 10, 1930. Serial No. 494,760.

This invention relates to rail joints, and more particularly to rail joints and bars therefor used in railroad tracks and in which the bars are bolted to the rail ends and have both center and end contact with the bearing surfaces of the rail ends, there being draw space for take-up of wear by bolt tension.

In rail joints of ordinary type, such as are now extensively used, the joint bars have bearing surfaces which contact the corresponding surfaces of the rail ends at both the center and the ends of the bar. The bars vary considerably in section. Plain angle bars are commonly used on medium weight rails and I-beam bars are used on heavy and extra heavy weight rails. Of recent years there has been a decided increase in weight of rolling stock and load, as well as in speed of traffic. To meet these conditions, heavier rails are being used by many of the railroads and, in order to obtain joints of adequate strength, heavily reinforced bars of I-beam type are used in the joints. These bars are of high carbon steel and are oil tempered to provide adequate lateral or transverse strength. Such bars resist lateral bending into the rail ends by bolt tension. It is also now the common practice to oil temper angle bars for increased transverse strength, and these bars also resist, to a great extent, lateral bending by bolt tension. Rail joint bars of present type, above referred to, are divided into two classes, short bars and long bars. Short bars are from 24 to 28 inches long; and long bars, from 36 to 42 inches long. Short and long bars are used on light and heavy rail indiscriminately although the present tendency for the heaviest rails now in use is a long bar 38 inches long. Joints constructed with short bars commonly have four bolts and such a joint is supported by ties at its ends. The long bars employ 6 bolts and such a joint is provided with a central supporting tie as well as end supporting ties.

In both the short bars and the long bars, after the joint has been in use for a short time wear develops at the center portion thereof and this wear, which is initially comparatively slow, quickly develops into looseness at the center of the joint, which results in batter and consequent rapid wear of the joint at the center portion thereof.

This center wear of the joint is well known by railroad engineers and is commonly accepted as characteristic of rail joints and unavoidable. I have found, however, that this center wear is due to inability of the bars to move in at the center portion of the joints, under bolt tension, to accurately fit the bearing surfaces of the rail ends as wear occurs. This results in looseness and batter, as above noted. This inability of the bars to move in at the center so as to accurately fit the rail bearing surfaces is due to what I term end drag, that is, the resistance to inward movement of the end portions of the bar. This drag is caused by the slow rate of wear of the end portions of the bearing surfaces of the bar relative to the center portions of such surfaces. I have found that this difficulty can be avoided by employing a shorter bar than has heretofore been thought possible, and subjecting the end portions of such bar to pressure inwardly toward the rail ends so as to assure wear of the end portions of the bearing surfaces of the bar and permit the ends to move in more evenly with the center.

It is, therefore, one of the main objects of my invention to provide a rail joint bar of substantially less length than bars now commonly used. A further object is to provide a bar of adequate lateral and vertical strength and so related to the rail ends as to assure tight bearing contact between the surfaces of the bar and the surfaces of the rail ends both at the center of the joint and at the ends thereof throughout the life of the joint. Another object is to provide a rail joint, and a bar therefor, so constructed and related that the joint is adequately supported by a single tie at the center thereof. Further objects and advantages of my invention will appear from the detailed description.

Figure 1:
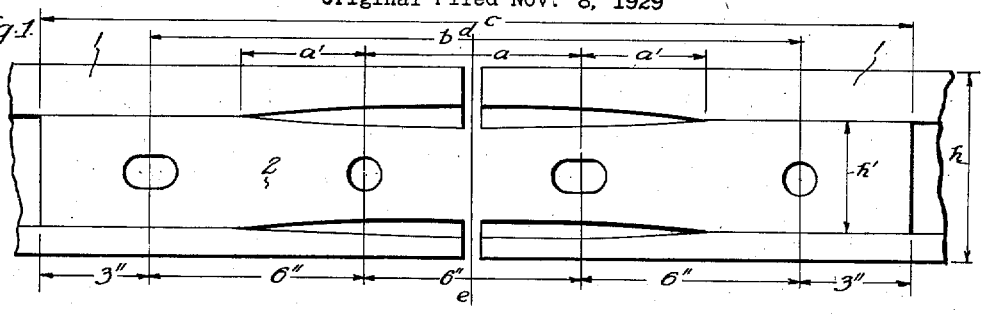
Figure 1 is a side view of a rail joint of present construction, the bar being shown as a flat strap for clearness of illustration, after wear has occurred.

In Figure 1 I have illustrated a rail joint of common construction such as is extensively used in railroad work. This joint comprises the rail ends 1 at each side of which is disposed a bar 2, these bars being secured together by bolts passing through the same and through the webs of the rail ends.

Figure 3:
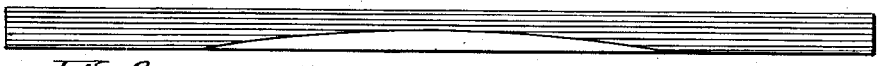
Figure 3 is a plan view of the head of the bar of Figure 2.
Figure 4:
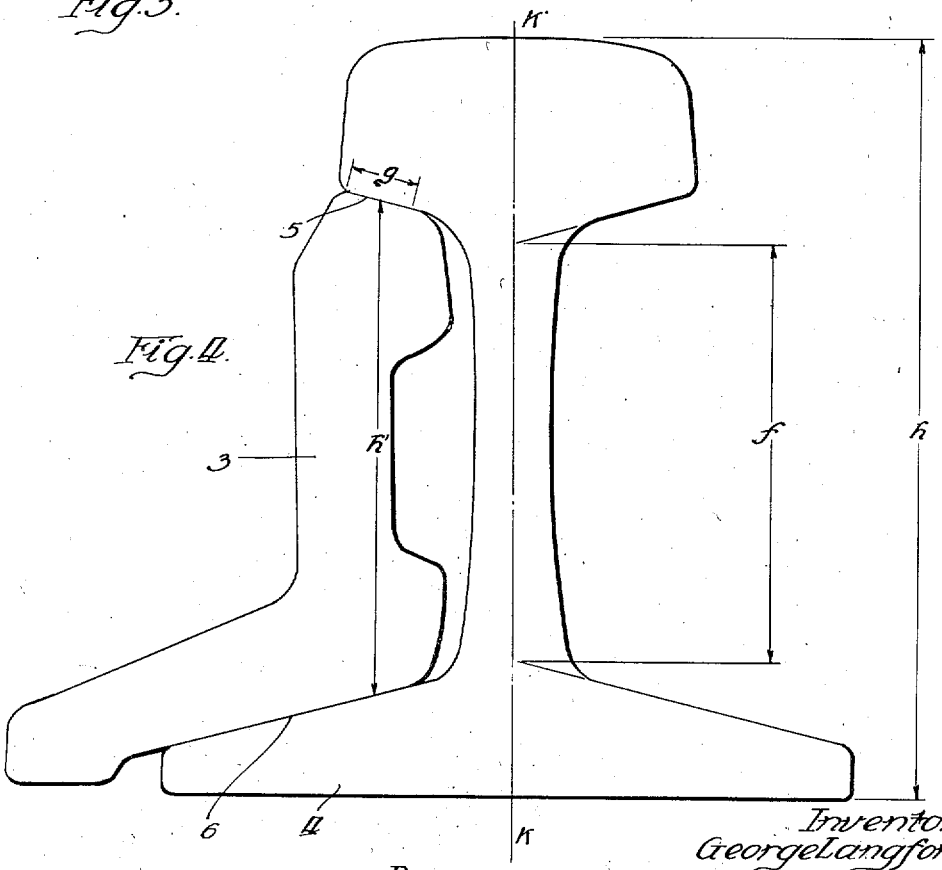
Figure 4 is an end view of an angle bar of known type applied to a rail end.

In the drawing, the bolts and associated nuts have been omitted for clearness of illustration. There is a draw space betwen each of the bars and the webs of the rail ends, and as wear occurs the bars are pulled in by bolt tension to take up wear, as is well known in the art. The bar 2 may be considered as an angle bar of known type and is provided with head and flange bearing surfaces which contact the corresponding surfaces of the rail ends. These bearing surfaces of the bar are of uniform width throughout the length thereof. After the joint has been in use a short time wear occurs at the center portion thereof and, due to end drag of the bars, the center portions of the bars cannot be drawn in by bolt tension so as to accurately fit the bearing surfaces of the rails at the center portion of the joint. As a result, looseness develops accompanied by batter and rapid wear of the bars. The greatest wear occurs in an area of the length indicated by *a* and extends to each side of the center line *d—e* for a distance approximately equal to the mean fishing height of the bar, indicated by *h'*, which is the mean fishing height of the bar as shown in Figure 4. The wear then tapers off through a distance indicated by *a'* and corresponding in length, approximately, to one and one-quarter times the mean fishing height of the bar, according to measurements taken from worn bars used on 90 pound rail, which may be considered as representative. The length of the wear area of the bar is, therefore, approximately equal to four and one-quarter times the mean fishing height of the bar. This wear area is indicated on the flange, in Figure 2, by the arcuate unshaded portion of the flange surface, and the wear area of the head is similarly indicated in Figure 3.

Figure 2:
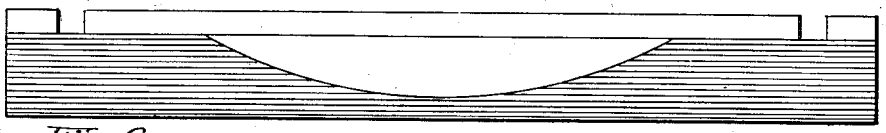
Figure 2 is an underneath flange view of an angle bar of known type used in a joint of the type illustrated in Figure 1, after wear.

This wear is characteristic of an angle bar and also occurs on I-beam, bars, though on the latter bars the wear area is not curved or arched to the same extent as on the angle bar. In general, the wear illustrated in Figures 2 and 3 is characteristic of both the angle bars and the I-beam bars. As previously stated, the cause of this center wear of the bar is due to end drag at the end portions of the bar beyond the wear area. The bar 2 of Figure 1 may be considered as a standard short length bar having a length of 24 inches. In such bars, the length of the wear area is approximately 12.8 inches. This means that there is approximately six inches at each end of the bar which is not subjected to appreciable wear and which presents great resistance to inward movement of the bar, resulting in the end drag referred to. In the bar of Figure 1, the mean fishing height *h'* may be taken as three inches. The length of this bar is, therefore, eight times its mean fishing height. It has generally been accepted by railroad engineers that a bar should be at least 24 inches in length to give the desired lateral strength of the joint and, so far as I am aware, no one has heretofore realized that the rapid wear of the center portion of the joint is due to end drag of the bar, and that important and novel results can be obtained by materially reducing the length of such bar.

Since the length of the wear portion of the bar is approximately 12.8 inches, by cutting off the ends of the bar immediately adjacent the ends of the wear portion, thus reducing the length of the bar to approximately 12.8 inches, end drag can be so greatly reduced that a bar of this length would move inwardly to the rails at approximately the same rate at the ends of the bar as at the center thereof. This is highly important as rendering it possible to maintain tight bearing contact between the bar and the rail ends throughout the whole length of the joint and during the entire life thereof. As a result, the wear, instead of being concentrated at the central portion of the bar, is distributed throughout the whole length of the joint, and the rate of wear is much slower than in a joint of present type in which looseness and resulting batter occur at the center portion of the joint. This means that by shortening the bar the life of the joint is greatly increased. However, it has been determined in the practical use of bars on rails weighing 60 pounds per yard and over, that there should be at least four holding bolts and that the holes in the bars should be at least one inch in diameter and spaced not less than four inches between centers, the two center bolts being preferably not less than four and one-half inches between centers. 4—4½—4 inch bolt spacing is considered very short and is in very restricted use. Even 5—5—5 inches is considered short spacing. It would be difficult to shorten a bar to 12.8 inches because of the necessity of too short bolt spacing.

The length needed for a rigid lateral splice must also be considered, and I find in practice that this length in an ordinary bar should approximate $6h'$, this figure being subject to certain modifications in various cases as will be explained later. A length $6h'$ is about the mean between 12.8 inches and the standard short length of 24 inches, and would in effect be a compromise, shortening each end 3 inches instead of 6 inches. However, in this 6 inches, the outer 3 inches is of greater drag than the inner 3 inches; furthermore, the end bolts instead of being 3, 3½ or 4 inches from each end, according to bolt spacing, are in my invention placed nearer the end, 1½ to 2½ inches, so that the more direct pull on the 3 inches of lesser drag, in great measure offsets the compromise of removing only 3 inches from each end. These figures may not be exact but are sufficiently so for purpose of illustration. I am therefore able to provide a bar, having sufficient extent of end bearings to give desirable lateral strength to the joint while preventing the end drag which occurs in bars of 24 inches or over in length.

The desired results can be obtained by using a bar approximately six inches longer than the length of the center wear, that is, by adding approximately three inches to each end of the 12.8 inch bar above referred to, thus producing a bar having a total length of approximately 18.8 inches.

In such a bar, the end bolts are positioned closer to the ends of the bar than in bars of present type, and the center bolts are also somewhat closer to the end bolts than in the bar of Figure 1. This results in overloading the ends of the bar, that is, in subjecting the ends of the bar beyond the center portion thereof corresponding to the length of the wear area of the bar of Figure 1, that is, the end three inches at each end of the bar, to such pressure that this three inches of the bearing surfaces will wear as fast as, or in some instances even faster than, the area of wear of the center portion of the bar. As a result, the entire bar will move into the rails, by bolt tension, at the same rate maintaining the joint tight at all times. This is particularly true of bars which resist inward bending at the center portion by bolt tension, such as oil tempered angle bars and I-beam bars of relatively great lateral strength.

An angle bar constructed in accordance with my invention may have a minimum length of approximately four and one-quarter times its mean fishing height, and a maximum length of between six and six and one-half times its mean fishing height, considering the length of the bar in terms of the mean fishing height as the unit of measurement.

It is to be noted, however, that the mean fishing height of a bar for use with given rail depends upon the total height of the rail and the fishing height of the rail which, in turn, depend upon the rail section. It is necessary, therefore, in computing the length of a bar for use with a given rail to take into consideration the rail section. The relation between the fishing height of the rail and its total height varies within limits. In some rails the fishing height is greater than one-half of the total height of the rail, whereas in other rails the fishing height is one-half of the total height, and in still other rails the fishing height may be somewhat less than one-half of the total rail height. In this connection, I wish to make it clear that my invention relates to bars for use with what are known to railway engineers and others skilled in the art as T-railway rails as distinguished, for instance, from street railway girder rails. I therefore take into consideration the relation between the mean fishing height of the bar, the fishing height of the rail, and the total height of the rail, in computing the length of the bar.

In Figure 4 I have shown an angle bar 3 constructed in accordance with my invention applied to a rail 4 the fishing height of which is indicated by $f$, the total height of the rail being indicated by $h$. The mean fishing height of the bar 3 is indicated by $h'$ and is the vertical distance from the transverse center of the head fishing surface 5 of the bar, the width of which is indicated by $g$, and the flange bearing surface 6 of the bar, taken on a line parallel to the central vertical axis $k$—$k$ of the rail. Line $g$ may be precisely defined as the straight line tangent to the bottom of the outer lower corner fillet of the rail head and the top of the fillet joining rail head and web. $h'$ is measured on the center of distance $g$.

As a basis for a formula in calculating the length of the bar I use the equation $$f \text{ equals } \frac{h}{2},$$

in which $f$ equals the fishing height of the rail and $h$ equals the total height of the rail.

The complete formula for the length of the bar in inches is—

$$L \text{ equals } 4.25\,h' \text{ minus } \left[4\left(f \text{ minus } \frac{h}{2}\right)\right] \text{ plus } 6,$$

or L equals $4.25h'$ minus $4f$ plus $2h$ plus 6. In the case of bars for use on rails in which $$f \text{ equals } \frac{h}{2}, f \text{ minus } \frac{h}{2}$$

becomes zero and the length of the bar is equal to four and one-quarter times its mean fishing height plus the constant six, stated in inches. In Figure 1, if it be assumed that the fishing height of the rail is equal to one-half of the total height of the rail, the length of the bar to be used on such rail would be approximately eighteen inches as indicated by *b*, or six inches shorter than the length of bar 2, the total length of which is indicated by *c*.

By constructing a bar in accordance with my formula above stated, the resulting bar is much shorter than bars of present type, for a given rail section. Rails weighing from 90 to 130 pounds per yard are extensively used and may be considered as representative. Ones weighing 120 to 130 pounds inclusive have recently come into very extensive use and are now defined as heavy rails. 130 pound rails originally tried out experimentally are rapidly coming into common use on heavy duty main line track. The tendency to increased weight of rail has grown so rapidly that sections heavier than 130 pounds per yard are being proposed for heavy duty railroad use, and 90 pound rail, once considered heavy, will soon be looked upon as too light for anything but branch line service.

The tracks of some railroads are subjected to less heavy duty than others, and 100 pound rail has until recently been considered by them as heavy enough for their purpose. This standard has now been raised by many of them to 110 pounds and may go higher. It is now realized that the increase in weight of rail has not kept pace with the heavy duty to which it is subjected; also that the weakest places in a track are at the joints, the weakness being due to the fact that joints cannot be kept tight at center as wear occurs, because of the end drag or reluctance of the ends of the bars to wear and move to the rails evenly with the center. My invention, by removing all or a part of the objectionable end drag, makes it possible to keep the central portion of a joint tighter than formerly under the exacting requirements of heavy duty track.

As I wish to limit my invention to bars on rails subjected to severe usage, the words "heavy duty" as applied to railway rails may be defined as applying to rails performing exacting service, namely, frequent repetition of heavy loads, such as a long line of heavily loaded freight cars running at fair speed, the severity of the duty increasing rapidly with increased speed. Trains with comparatively few or light cars would not put such a burden upon the track. In the case of rapid transit passenger service in great part and requirements of industrial plants the burden would be still less.

It may be seen that my invention is particularly adapted to track subjected to exacting service and I wish to limit it to joints subjected to heavy duty wherefrom a joint suffers most. I also limit my invention to bars which are intended to form, with the rail ends, a complete rail joint, without any necessity for using supplemental holding bars or equivalent members. To this end, the bars of my invention have four bolt holes for bolting to the rail ends in a known manner, as previously noted.

An 80 pound rail known as ASCE, and having section No. 8040 has a total height of five inches, and a fishing height of two and five eighths inches, the bars used with such rail having a mean fishing height of three and one sixty-fourth inches and a minimum length of twenty-four inches. It will be noted that the length of the bar is approximately eight times its mean fishing height.

A bar for use with this rail, constructed in accordance with my formula, has a length of 18.33 inches, or approximately six times its mean fishing height, my bar being approximately six inches shorter than the present bar now used on this rail. Another rail known as D. L. & W. having section No. 9133 and weighing 91 pounds per yard, has a total height of five and one-quarter inches, and a fishing height of two and eleven-sixteenths inches. This rail uses bars having a mean fishing height of three and one-eighth inches and a minimum length of twenty-four inches. By my formula the length of the bar for this rail is 18.92 inches. A rail known as ASCE, having section No. 10,040 and weighing 100 pounds per yard, has a total height of five and three-fourths inches and a fishing height of three and five sixty-fourths inches, and the bars used on this rail have a mean fishing height of three and nine-sixteenths inches and a total length of twenty-four inches, or approximately seven times the mean fishing height of the bar. By my formula, the bar for use on this 100 pound rail has a length of 20.33 inches, or approximately six times its mean fishing height and four inches less than the present bar used with such rail. A 120 pound rail, known as AREA and having section No. 12025, has a total height of 6½ inches, a fishing height of $3\frac{17}{32}$ inches, and uses bars having a mean-fishing height of $4\frac{1}{16}$ inches and a minimum length of 24 inches, approximately six times their mean fishing height. A bar for use with this rail, constructed in accordance with my formula, has a maximum length of but 22.12 inches, which is less than five and one-half times its mean fishing height.

From the above it will be apparent that by my formula the bars bear a definite relation to the total height and the fishing height of the rail, and are of such length as to assure adequate lateral strength of the joint while preventing end drag which, in rail joints of ordinary type, prevents the ends of the bars from moving into the rails. As has been above pointed out, it is the end two or three inches at the ends of the bar which most seriously oppose inward movement of the bar to the rail ends and create the objectionable end drag.

By eliminating these objectionable end portions of the bar, end drag such as occurs in bars of ordinary type is avoided with the result that the bar as a whole moves inwardly to the rails, under bolt tension, so that the joint is maintained tight at all times at the center as well as at the end portions thereof, and looseness at the center portion of the joint with resulting batter and rapid wear is eliminated. This is rendered possible by using bars substantially shorter than the shortest bar now used, which is twenty-four inches in length, and I believe this to be broadly new.

Figure 5:
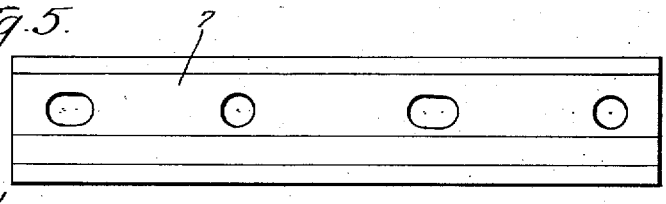
Figure 5 is an outer side view of an angle bar constructed in accordance with my invention.
Figure 6:
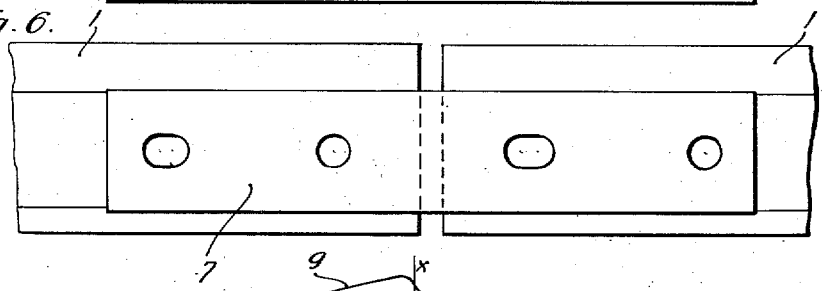
Figure 6 is a side view of a rail joint employing the bar of Figure 5, after wear has occurred.

The bar 7 of Figure 5 is for use on a rail having a total height of five and seventeen sixty-fourths inches, and a fishing height of two and five-eighths inches, this rail being known as ARA—B, section No. 9,030, and weighing 90 pounds per yard. A bar of ordinary type for use on this rail would have a minimum length of twenty-four inches. A bar constructed in accordance with my formula, for use on this 90 pound rail has a length of 18.92 inches. In Figure 6, I have shown a joint having a bar 7 at each side thereof, these bars being applied to the rail ends 1 in a known manner. The bar of Figure 6 has been shown as a flat strap, for clearness of illustration. As wear progresses, the bars are pulled inward to the rail by bolt tension, and the rate of wear of the bearing surfaces at the end portions of the bars is such that these end portions move inwardly more evenly with the center than in ordinary bars now in common use. As a result, the bearing surfaces of the bars are maintained in tight contact with the rail bearing surfaces at all times and the bars wear accurately into the rail ends as wear is taken up.

The wear is distributed throughout the full length of the joint and is comparatively slow, as previously noted. As the bar wears into the joint, the bearing surfaces thereof are maintained tight, as illustrated, from end to end of the bar. This provides a simple and highly efficient joint which possesses ample strength both vertically and transversely, and in which center looseness with resulting batter and consequent rapid wear at the center of the joint is eliminated. The bar of Figures 4, 5 and 6 is an angle bar of known type but, being constructed in accordance with my invention, is substantially shorter than angle bars ordinarily used in rail joints with the results above discussed of increased life and substantially uniform wear of the joint throughout the entire length thereof.

Figure 7:
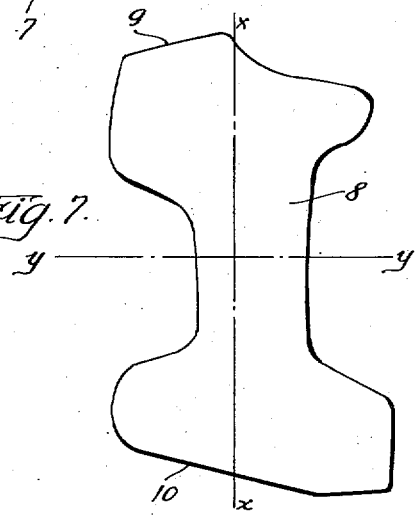
Figure 7 is an end view of an I-beam bar in accordance with my invention.

I find that by constructing the bar so as to have greatly increased lateral strength, it is possible to use bars even shorter than bars constructed in accordance with my formula above stated. In Figure 7, I have illustrated, in end view, a bar of heavy I-beam section. The metal of this bar is so distributed that it is substantially balanced at opposite sides of its vertical neutral axis $x—x$ and above and below its horizontal neutral axis $y—y$, the lateral strength of this bar being equal to at least one-third, and preferably one-half, of its vertical strength.

In the strongest I-beam bars with which I am familiar, the vertical strength of the bar is approximately three and one-half times its lateral strength. So far as I am aware, no I-beam bar of present construction has a lateral strength equal to or greater than one-third of its vertical strength. This is important as providing a bar of great lateral strength which effectually resists inward bending under bolt tension, so that the end portions of the bar are subjected to pressure effectively applied thereto in such manner as to assure that the ends of the bar will move inwardly to the rails, under bolt tension, as rapidly as the center portion of the bar. It will further be noted that the width of the head bearing surface 9 of bar 8 of Figure 7 is equal to at least one-half of the width of the bearing surface 10 at the foot portion of the bar. This is advantageous as providing relatively wide bearing surfaces both at the head and the foot of the bar, which is desirable for more effectively bracing the rail ends, and also obtains more nearly uniform rate of inward movement of the head and foot portions of the bar as wear progresses. Also, by having the bar 8 of comparatively great lateral strength, it is possible to use a shorter bar for a given rail section than a bar constructed in accordance with my formula above set forth, since the bar 8 possesses sufficient lateral strength to assure that the lateral strength of the joint will be amply adequate to withstand the stresses to which it is subjected.

Figure 8:
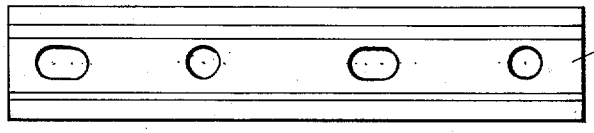
Figure 8 is a side view of an I-beam bar, such as that shown in Figure 7, on a reduced scale.
Figure 9:
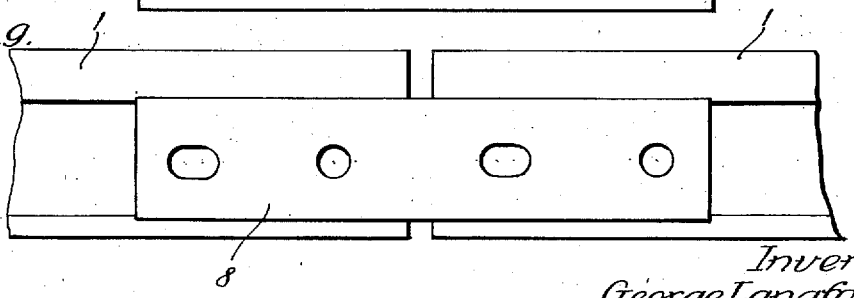
Figure 9 is a side view of a rail joint employing the bar Figure 8 after wear has occurred, the bar being shown as a flat strap.

The bar of Figure 8, which is constructed similarly to the bar of Figure 7, has a length equal to approximately five times its mean fishing height. In Figure 9 I have illustrated bar 8 as applied in a joint. This bar functions in much the same manner as the bar 7 of Figure 6, and wears at the rail ends in such manner that a tight joint is maintained at all times, both at the center of the joint and at the ends thereof. In Figure 9, as in Figure 6, the bar has been shown as a flat strap and the nuts and bolts have been omitted, for clearness of illustration.

Figure 10:
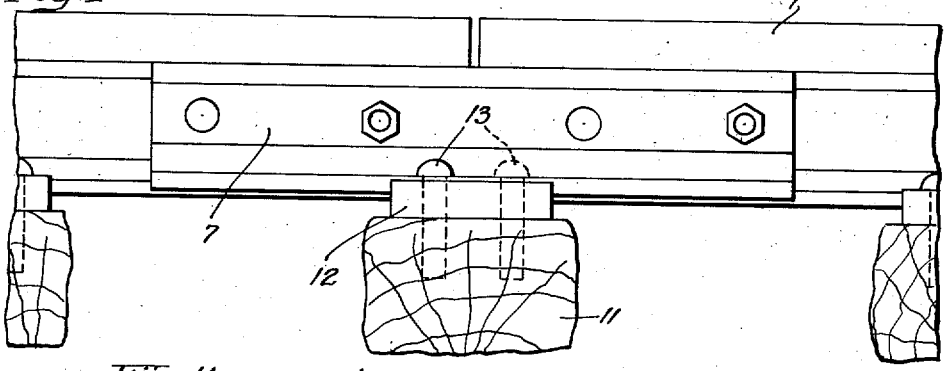
Figure 10 is a side view of a joint having a central supporting tie and using angle bars such as that of Figure 5.

In Figure 10 I have illustrated a rail joint using the bar 7 of Figure 5, showing the joint when the bar is initially applied. The center of this joint is supported by a tie 11, the joint seating upon a tie plate 12 which is secured to the tie by spikes 13, these spikes also serving to secure the rail ends and bars to the tie in a known manner. It will be noted that the joint is supported at the center but is unsupported at the ends thereof.

Figure 11:
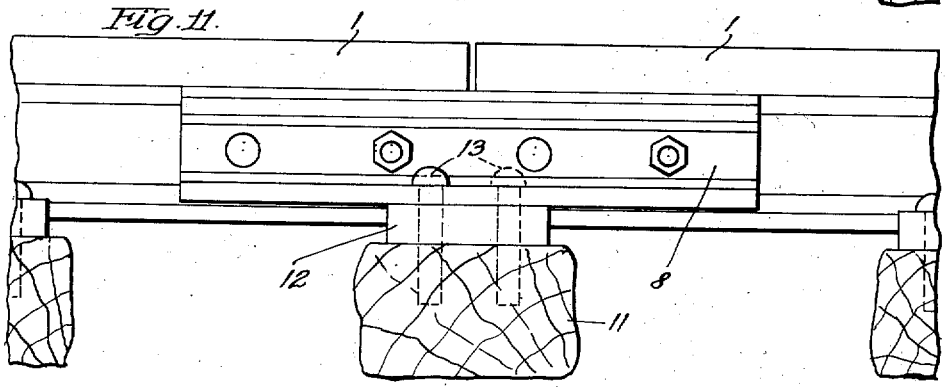
Figure 11 is a side view of a joint having a central supporting tie and using bars similar to that of Figure 8.

In Figure 11 I have illustrated a joint similar to that of Figure 10 except that in this joint I use the I-beam type of bar illustrated in Figures 7 and 8. This bar, due to its short length and great lateral strength, is well adapted for use in a one tie center supported joint, and all necessity of supporting the ends of the joint by ties is avoided.

Figure 12:
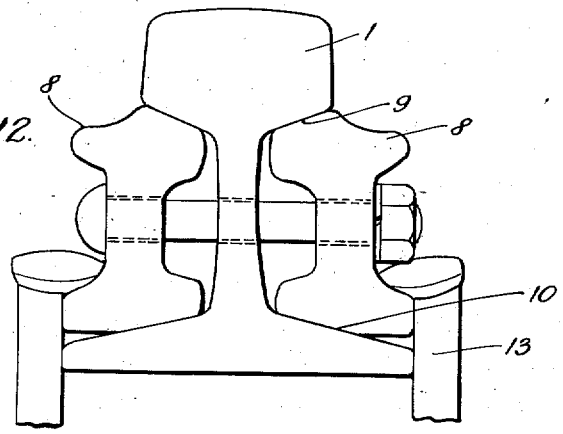
Figure 12 is an end view of the joint of Figure 11.
Figure 13:
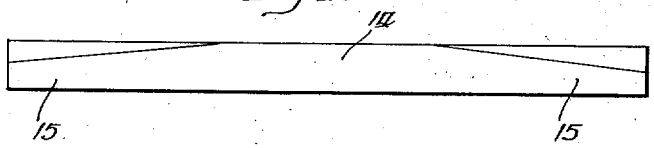
Figure 13 is a plan view of the head of a modified form of I-beam bar.
Figure 14:
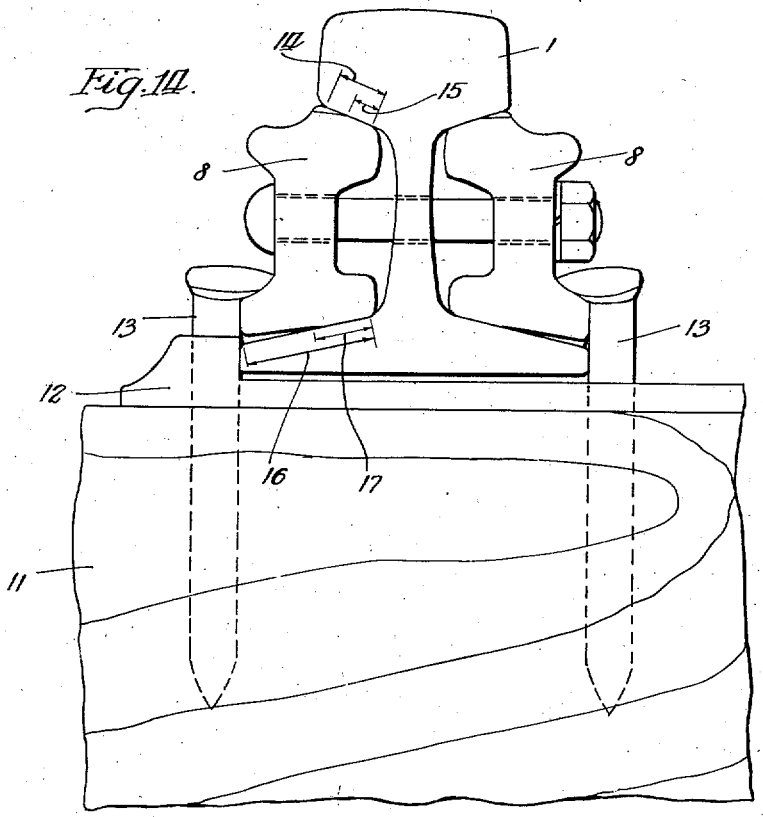
Figure 14 is an end view of a joint using the bar of Figure 13.

In Figure 13 I have illustrated a modified form of I-beam bar. This bar is constructed similarly to the bar of Figures 7 and 8 but the bearing surface of the head of the bar is reduced at the end portions thereof, this surface having a center portion 14 and end portions 15 of less contact area per unit of length than the center portion. In Figure 14 I have illustrated, in end view, a joint embodying bars similar to that of Figure 13. In Figure 14 the width of the center portion of the head bearing surface is indicated by 14 and the width of the end portion of such surface is indicated by 15, the width of the center portion of the flange bearing surface being indicated by 16 and the width of the end portion of the flange bearing surface being indicated by 17. This reduction of the end portions of the bearing surfaces is advantageous as assuring that the end portions of such surfaces will wear as rapidly as the center portion thereof, which assures that the ends of the bars will move inwardly to the rails at least as fast as the center portions thereof. This renders it possible to maintain the bars in tight bearing contact with the bearing surfaces of the rail ends both at the center and the end portions of the joint, throughout the life of the joint, with the advantages above set forth. It will be noted that in both Figures 12 and 14, the foot portions of the bars are disposed within the outline of the rail flange, and the heads of the spikes 13 project inwardly over the foot portions of the bars.

This is advantageous as preventing weakening of the bars due to the provision of spike slots therein. By constructing the bars in accordance with my invention I am enabled to employ bars for any given section of rail appreciably shorter than any bars now used for such rail section, thus effecting a material saving in metal. In addition to effecting a saving in metal, I also assure that the joint is maintained tight at all times throughout its entire length, thus greatly increasing the life of the joint over joints employing bars of present type. So far as I am aware, bars of less than twenty-four inches in length have never been used on joints in railroads, and it has not heretofore been known or appreciated that by reducing the length of the bar, and in this manner eliminating end drag, the characteristic center wear of a rail joint can be prevented and the life of the joint greatly increased.

A further advantage of my bar is that it effects a material reduction in weight over bars of ordinary type. Also, by having the bar relatively short greater accuracy in forming the bar, particularly the bearing surfaces thereof, is obtained. It is quite easy to make a perfectly straight bar 18 or 20 inches long, but a bar 24 inches or longer frequently requires straightening after cooling, which is objectionable as increasing expense and, also, due to the fact that injury to the steel is apt to result from the hammer blows required by cold straightening, which is usually employed.

What I claim is:

1. A four-bolt rail joint bar for use in railroads and with rails weighing from sixty pounds to one hundred twenty pounds per yard, said bar being adapted for bolting to T-rail ends, said bar having bearing surfaces adapted for bearing contact with the bearing surfaces of the rail ends at both the center and the ends of the bar, the length of the bar being less than six times its mean fishing height.

2. A four-bolt rail joint bar for use in railroads and with rails weighing from sixty pounds to one hundred and twenty pounds per yard, said bar being adapted for bolting to the rail ends and having bearing surfaces adapted for both center and end contact with the bearing surfaces of the rail ends, the length of the bar being substantially less than twenty-four inches.

3. A rail joint bar for use in railroads and adapted for bolting to rail ends, said bar having bearing surfaces adapted for bearing contact with the bearing surfaces of the rail ends at both the center and the ends of the bar, the length of the bar being less than six times its mean fishing height, the end portions of one of the bearing surfaces of the bar being reduced in area per unit of length relative to the center portion of such surface.

4. A rail joint bar for use in railroads and adapted for bolting to rail ends, said bar having bearing surfaces adapted for bearing contact with the bearing surface of the rail ends at both the center and the ends of the bar, the length of the bar being less than six times its mean fishing height, the end portions of each of the bearing surfaces of the bar being reduced in area per unit of length relative to the center portion of such surface.

5. A four-bolt rail joint bar for use in railroads and adapted for bolting to T-rail ends, said bar having bearing surfaces adapted for bearing contact with the bearing surfaces of the rail ends at both the center and the ends of the bar, the bar being of sufficient transverse strength to resist lateral bending under bolt tension and the length of said bar being less than six times its mean fishing height.

6. A four-bolt rail joint bar for use in railroads and on rails weighing sixty pounds to one hundred and twenty pounds, said bar being adapted for bolting to rail ends and having bearing surfaces adapted for bearing contact with the bearing surfaces of the rail ends at both the center and the ends of the bar, said bar being less than twenty-four inches in length.

7. A rail joint bar for use in railroads and on the T-rails weighing eighty pounds to one hundred and twenty pounds per yard, said bar being adapted for bolting to rail ends and having bearing surfaces adapted for bearing contact with the bearing surfaces of the rail ends at both the center and the ends of the bar, said bar being less than twenty-four inches in length and of heavy I-beam section, the transverse strength of the bar being sufficient to resist inward bending by bolt tension.

8. A rail joint bar for use in railroads and on T-rails weighing eighty pounds to one hundred and twenty pounds per yard, said bar being adapted for bolting to rail ends and having bearing surfaces adapted for bearing contact with the bearing surfaces of the rail ends at both the center and the ends of the bar, said bar being less than twenty-four inches in length and of heavy I-beam section, and substantially balanced on its vertical neutral axis for lateral strength.

9. A rail joint bar for use in railroads and adapted for bolting to the rail ends, said bar being of I-beam section and having head and foot portions provided with bearing surfaces adapted for both center and end contact with the bearing surfaces of the rail ends, said bar being less than twenty-four inches in length, one of the bearing surfaces of the bar having its end portions reduced in contact area per unit of length relative to the center portion of such surface.

10. In a rail joint, in combination with the rail ends, bars bolted to the rail ends and having both center and end bearing contact therewith, the length of each of the respective bars being less than six times its mean fishing height, the area of contact between one of the bearing surfaces of the respective bars and the corresponding surface of the rail ends being reduced per unit of length at the end portions of the joint relative to the center portion of the joint.

11. In a rail joint, in combination with T-rail ends, four-bolt bars bolted to the rail ends and having both center and end bearing contact therewith, the length of each of the respective bars in inches being not greater than four and one-quarter times the mean fishing height of the bar minus four times the rail fishing height plus twice the total rail height plus six.

12. In a rail joint, in combination with T-rail ends, four-bolt bars bolted to the rail ends and having both center and end bearing contact therewith, the length of each of the respective bars being less than six times its mean fishing height, and a tie beneath and supporting the center of the joint, the joint being unsupported at its ends by ties.

13. A four-bolt rail joint bar for use in railroads and with T-rails weighing 110 pounds and over per yard, said bar having bearing surfaces adapted for bearing contact with the bearing surfaces of the rails at both the center and the ends of the bar, the length of the bar expressed in inches being not greater than four and one-quarter times the mean fishing height of the bar minus four times the rail fishing height plus twice the total rail height plus six.

14. A rail joint bar for use in railroads and adapted for bolting to the ends of T-rails weighing over 120 pounds per yard, said bars having bearing surfaces adapted for bearing contact with the bearing surfaces of the rail ends at both the center and ends of the bar, the length of the bar expressed in inches being not greater than four and one-quarter times the means fishing height of the bar minus four times the rail fishing height plus twice the total rail height plus six, and the end portions of one of the bearing surfaces of the bar being reduced in area per unit of length relative to the central portion of such surface.

15. A rail joint bar for use in railroads and on T-rails weighing over 120 pounds per yard, said bar being adapted for bolting to rail ends and having surfaces adapted for bearing contact with the bearing surfaces of the rail ends at both the center and the ends of the bar, the length of said bar expressed in inches being not greater than four and one-quarter times the mean fishing height of the bar minus four times the rail fishing height plus twice the total rail height plus six, the transverse strength of the bar being sufficient to resist inward bending by bolt tension.

16. A rail joint bar for use in railroads and on T-rails weighing over 120 pounds per yard, said bar being adapted for bolting to rail ends and having bearing surfaces adapted for bearing contact with the bearing surfaces of the rail ends at both the center and the ends of the bar, the length of said bar expressed in inches being not greater than four and one-quarter times the mean fishing height of the bar minus four times the rail fishing height plus twice the total rail height plus six, said bar being substantially balanced on its vertical neutral axis for lateral strength.

17. In a rail joint in combination with T-rail ends, weighing 110 pounds and over per yard, four-bolt bars bolted to the rail ends and having both center and end bearing contact with the rail ends, the length of each of the respective bars expressed in inches being not greater than four and one-quarter times the mean fishing height of the bar minus four times the rail fishing height plus twice the total rail height plus six.

18. In a rail joint in combination with T-rail ends weighing 110 pounds and over per yard, four-bolt bars bolted to the rail ends and having both center and end bearing contact with the rail ends, the length of each of the respective bars expressed in inches being not greater than four and one-quarter times the mean fishing height of the bar minus four times the rail fishing height plus twice the total rail height plus six, and a tie beneath and supporting the center of the joint, the joint being unsupported at its ends by ties.

In witness whereof, I have hereunto subscribed my name this 7th day of November, A. D. 1930.

GEORGE LANGFORD.